United States Patent [19]
Sohn

[11] Patent Number: 5,246,353
[45] Date of Patent: Sep. 21, 1993

[54] AIR BREEZING PUMP

[76] Inventor: Tong-Hoon Sohn, #5-602, Kwang-Zang Apt., 28 Yoido Dong, Yongdeungpo-ku, Seoul 150-010, Rep. of Korea

[21] Appl. No.: 910,559

[22] Filed: Jul. 8, 1992

[30] Foreign Application Priority Data

Jul. 9, 1991 [KR] Rep. of Korea .................. 11612

[51] Int. Cl.⁵ ............................................. F04B 35/04
[52] U.S. Cl. .................. 417/413 R; 417/417; 381/199; 381/201; 310/15
[58] Field of Search ............. 417/413, 417, 416, 480; 381/199, 201, 202; 310/15, 17, 21, 22

[56] References Cited
U.S. PATENT DOCUMENTS

| | | | |
|---|---|---|---|
| 4,427,906 | 1/1984 | Kainuma et al. | 417/416 |
| 4,547,632 | 10/1985 | Bryson | 381/199 |
| 4,595,801 | 6/1986 | Coffin | 381/90 |

FOREIGN PATENT DOCUMENTS

| | | | |
|---|---|---|---|
| 1613678 | 12/1990 | U.S.S.R. | 417/416 |
| 1192911 | 5/1970 | United Kingdom | 417/416 |

*Primary Examiner*—Richard A. Bertsch
*Assistant Examiner*—David W. Scheuermann
*Attorney, Agent, or Firm*—Robert E. Bushnell

[57] ABSTRACT

An air breezing pump designed to supply air for biasing the vibrator of a speaker by providing a conventional speaker with an air inlet valve and an air outlet valve on its vibrating medium, and thereby excluding existing ducts from the enclosure of the speaker assembly.

12 Claims, 2 Drawing Sheets

AIR BREEZING PUMP

CROSS-REFERENCE TO RELATED APPLICATIONS

This application makes reference to a co-pending application of mine entitled (INSERT TITLE OF APPLICATION) simultaneously filed in the United States Patent & Trademark Office on Jul. 8, 1992, and incorporates the abstract, specification, drawings and claims of that co-pending application.

BACKGROUND OF THE INVENTION

1. Field of the Invention

The present invention relates to new invented acoustic speaker system, and more particularly, to an air biasing breezing pump for biasing a conic-shaped vibrator of a conventional speaker while the vibrator is vibrating.

2. Background Discussion

My above-referenced speaker system disclosed in an application for letters patent filed in the U.S. Patent & Trademark Office on Jul. 8, 1992 comprises, inter alia a biasing mechanism for biasing the cone-shaped vibrator by breezing air. That air is normally compressed by a compressor made of metal and driven to supply a compressed air tank which is impractical and unrealistic as a portable speaker attachment because they are simply too heavy to handle and too noisy to the point of impairing the fidelity of reproduced sound emanating from the speaker system.

Furthermore, another art, namely Japanese Utility Model No. HEI-2-20471 issued on Jun. 4, 1990 MAGNET DRIVEN PUMP has a smaller diameter of its piston portion than that of magnetic circuit portion of the main body of the pump. This means that such a magnet driven pump is heavy and unsuitable for use as a portable pump.

The bearing support for spherical pumps disclosed in U.S. Pat. No. 4,822,256 (issued on Apr. 18, 1989) also has a rooter-impeller unit with a diameter layer than that of its outer casing.

SUMMARY OF THE INVENTION

Accordingly, it is general object of the present invention to provide an improved air breezing pump. It is another object to provide an air breezing pump to supply air to bias a vibrator which is portably attached on an audio speaker.

It is yet another object to provide an air breezing pump exhibiting less noise than currently available air pumps.

It is still another object to provide an air breezing pump having reduced weight.

It is still yet another object to provide an air breezing pump with an equal smaller, or larger diameter of the piston than that of the main body of its container.

These and other objects and advantages, may be obtained with an air breezing pump formed by a container, a reciprocating unit and magnetic circuit incased within the container. The container is formed with a cup-shaped housing connected to a cylindrically-shaped billows along its open circumference. The reciprocating unit has a cup-shaped bobbin, moving coils wound around the cup-shaped bobbin, an open cylinder surrounding, but spaced apart from the bobbin, a piston stem attached to one base of the bobbin, and a circularly-shaped plate piston plate connected to the piston stem and billows. Air inlet and outlet valves are formed in the piston. The magnetic circuit as a cylindrical center pole, and annular yoke positioned under the center pole, a magnet, a plate, and an annular ferrite coil bisecting the cylinder of the reciprocating unit. The reciprocating unit and magnetic circuit are coaxially and symmetrically arranged around the piston stem.

DESCRIPTION OF THE DRAWINGS

Other and further advantageous features of the present invention will hereinafter more fully appear in connection with a detailed description of the drawings in which.

DESCRIPTION OF THE PREFERRED EMBODIMENTS

The following description is of the best presently contemplated mode of carrying out principles of my the invention. This description is made for the purpose of illustrating the general principles of the invention and is not to be taken in a limiting sense. This scope of the invention is best determined therefore, by the appended claims.

Figure 1:
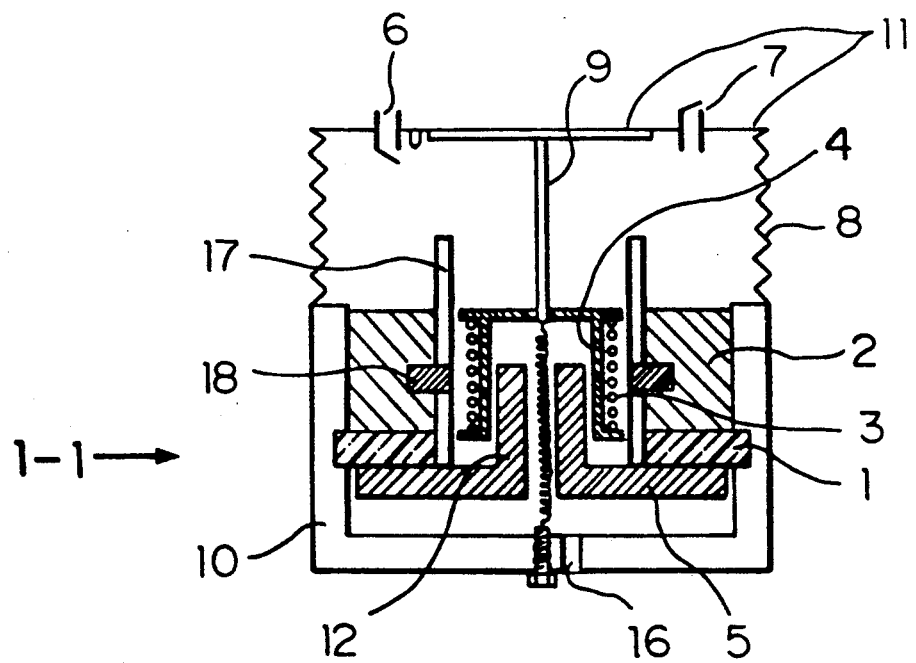
FIG. 1 is a cross-sectional view of an air breezing pump constructed according to the principles of the present invention.
Figure 2:
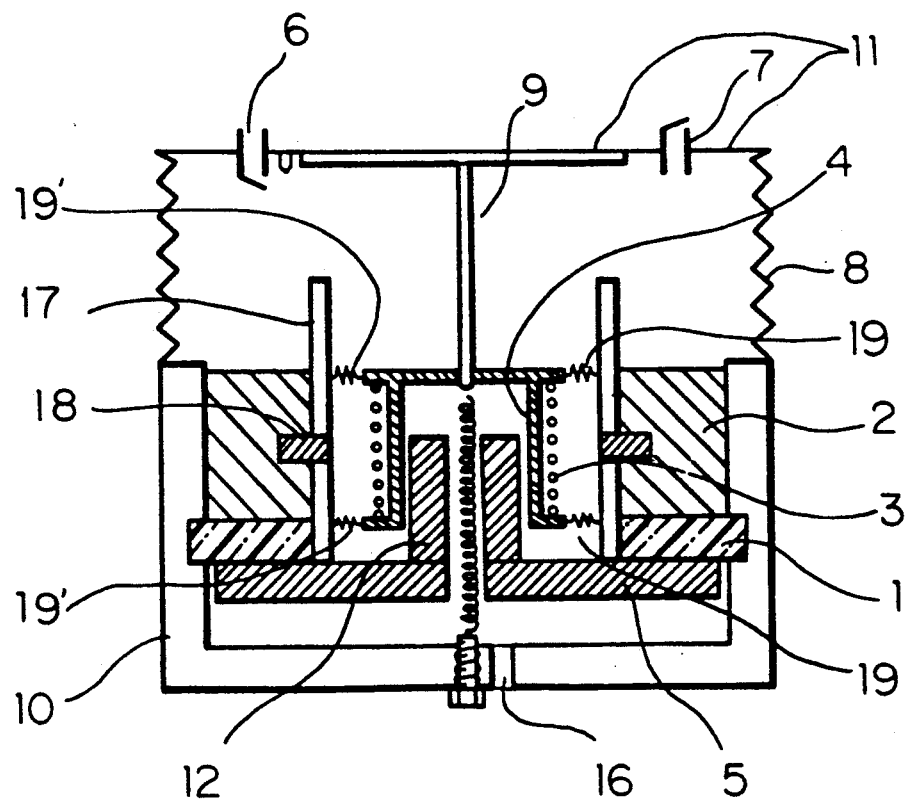
FIG. 2 is a cross-sectional view of another embodiment of an air breezing pump.

Turning now to the drawings, and to FIGS. 1 and 2 in particular, the air breezing pump 1-1 of the present invention is for biasing the cone-shaped vibrator of my other inventions namely my SOUND INNOVATION SPEAKER SYSTEM, which may have a conventional speaker assembly excluding ducts, but including a novel air inlet valve and outlet valve on its vibrator. Alternatively, the speaker assembly may be constructed with a reciprocating unit and magnetic circuit, where reciprocating unit generally comprises a cone-shaped vibrator, bobbin, voice coil, and damper; and magnetic circuit has a yoke, center pole, plate, magnet and ferrite core.

Referring to FIGS. 1 and 2 again, an air breezing pump comprises a containing unit, a reciprocating unit, and a magnetic circuit. The containing unit has an open cup-shaped container 10 with a bottom perforated by a pressure equalizing air path 16. The edges of the open upper portion of container 10 is air tightly connected to be cylindrical-shaped bellows and the reciprocating unit has a cup-shaped bobbin 4 on which moving coils 3 are wound, positioned to slidably reciprocate within cylinder 17 with, for example, soaked soft gaskets (not shown in the figure) on both upper and lower end rims, a piston stem 9 having one end connected vertically to the bobbin 4 at its center, and a circular plate-shaped piston 11 vertically connected to the other end of the stem 9 and air-tightly connected to a cylindrically-shaped bellows 8 along their conforming circumferential edges. An air inlet valve 6 and an air outlet valve perforate position 11, and the diameter of piston 11 could be enlarged or reduced without varying the size of the container 10 by conformingly enlarging, or reducing, the diameter of the upper rim of the bellows 8, so that eventually the diameter of piston 10 could be larger, or smaller, than that of container 10. The magnetic circuit is made of a cylindrical center pole 12 having one end vertically connected to a circular plate-shaped yoke 5 on which a ring-shaped magnet 1 and a plate 2 containing an annular ferrite core 18 for connecting magnetic force, are laminated together within container 10 and outside of cylinder 17. Cylinder 17 is tightly and vertically connected to yoke 5, and is positioned inside of the apertures of magnet 1 and plate 2, and is located slidably on the outside of bobbin 4. Bobbin 4 is, in turn, located uncontactably inside said center pole 12 so as to avoid contact between the interior surface of bobbin 4 and the exterior circumferential surface of center pole 12. Center pole 12 and plate 2 must be located very close to each other for better functioning of magnetic circuit. A spring 9a extends from the proximal end of piston stem 9, and is attached to an adjustment screw 9b threadingly engaging the base of said container 10.

Referring now specifically to FIG. 2 cylinder 17 with related outside things in the FIG. 1 is enlarged wide enough to install damper 19, 19', between the cylinder 17 and the bobbin 4, at the lower and upper end rims of bobbin 4 in substitution for the soft gasket of the embodiment of FIG. 1. The dampers 19, 19', will allow the free reciprocating motion of the reciprocating unit like the soft gasket mentioned earlier in the embodiment of FIG. 1.

Figure 3:
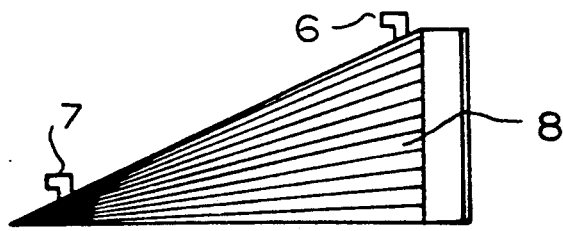
FIG. 3 is a diagrammatic side elevational view of a bellows of an air breezing pump not showing reciprocating unit that drives the bellows.

FIG. 3 is a right triangle bellows 8 shown on a cross-sectional elevational side view of an air breezing pump comprising a reciprocating unit on one side. The bellows 8 has an inlet valve 6 and outlet valve 7.

Figure 4:
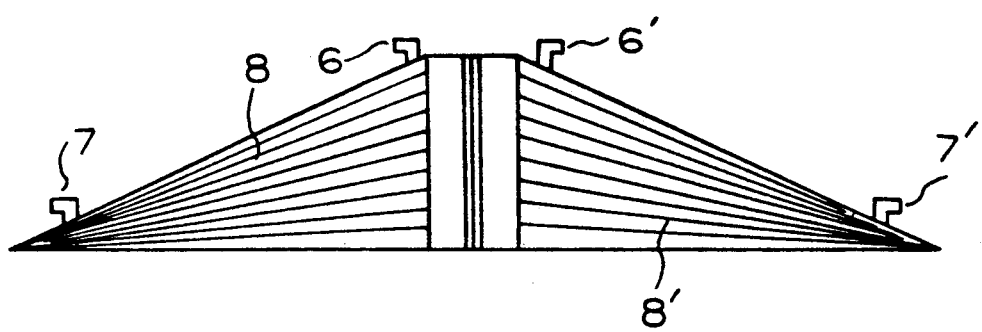
FIG. 4 is a diagrammatic side elevational view of the two bellows of an air breezing pump, vertically and symmetrically combined.

FIG. 4 is an air breezing pump comprised of two bellows 8, 8' symmetrically disposed with each of the bellows having inlet valves 6, 6' and outlet valve 7, 7', respectively, and a reciprocating unit (not shown n the figure) between the two bellows 8, 8'.

Figure 5:
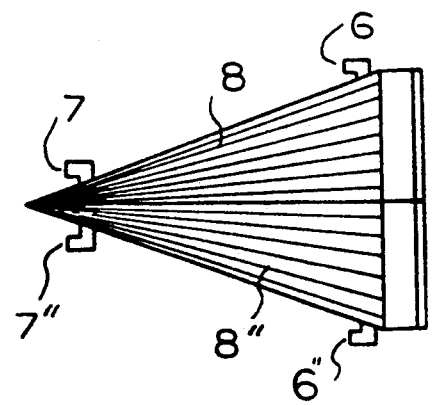
FIG. 5 is a diagrammatic side elevational view of two bellows of an air breezing pump horizontally and symmetrically combined.

FIG. 5 is the symmetrically doubled version of the air breezing pump shown in FIG. 3.

Figure 6:
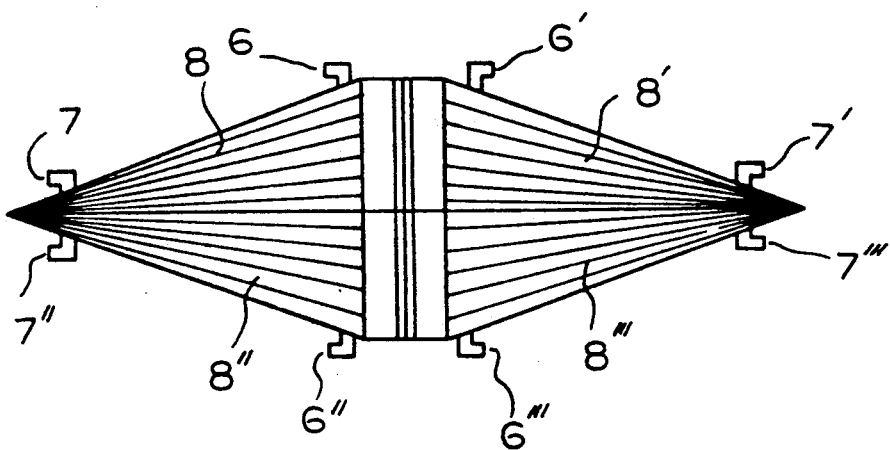
FIG. 6 is a diagrammatic side elevational view of a bellows vertically and horizontally combined.

FIG. 6 is the symmetrically doubled version of the air breezing pump shown in FIG. 4.

In operation, an electrical signal generated by a variable speed alternating current generator, for example, may be applied to activate moving coil 3. The air breezing pump will supply air, under pressure, to the comic vibrator of the speaker unit disclosed in my earlier referenced co-pending application.

What is claimed is:

1. An air breezing pump, comprising:
   a housing having a cup-shaped container having an open end, and cylindrical-shaped expandable bellows connected to said cup-shaped container and forming an air-tight junction closing said open end of said cup-shaped container;
   a reciprocating unit having a cup-shaped bobbin, a moving coil wound around said bobbin, a cylinder spaced-apart and surrounding said bobbin, a piston stem having one terminus coupled to and extending axially outward from one end of said bobbin, a circularly-shaped piston connected to a second terminus of said piston stem, said bellows extending between and forming an expandable chamber between said cup-shaped container and said piston;
   an air inlet valve enabling passage of air into said chamber;
   an air outlet valve enabling passage of atmospheric air from within said chamber; and
   a magnetic circuit having a cylindrical centrally positioned pole, an annular yoke adjoining said pole, a permanent magnet positioned upon said yoke, a ferrite core spaced apart from said coil, a plate surrounding a plurality of sides of said ferrite core, said plate being spaced-apart from said bobbin and positioned upon said magnet.

2. An air breezing pump according to claim 1, further comprised of a plurality of dampers disposed between the cylinder and said bobbin.

3. An air breezing pump according to claim 1, further comprised of the plate encasing three of four exterior surfaces of said ferrite.

4. An air breezing pump according to claim 1, further comprised of the bellows forming a right triangle-shape, and said reciprocating unit being installed on one side of said bellows.

5. An air breezing pump according to claim 1, further comprised of said bellows forming two symmetrically disposed portions, and said reciprocating unit being installed between said two portions.

6. An air breezing pump according to claim 1, further comprised of said piston having a diameter variably larger and smaller than said container.

7. An air breezing pump, comprising:
   a containing unit;
   a reciprocating unit; and
   a magnetic circuit;
   wherein said containing unit comprises a cup-shaped container and cylindrical-shaped bellows connected to said container;
   the reciprocating unit comprising a cup-shaped bobbin, moving coils wound around said bobbin, a cylinder formed around said bobbin, a piston stem coupled to the top of one end of the bobbin, a piston connected to said piston stem and said bellows, and an air inlet valve and air outlet valve formed in said reciprocating unit;
   the magnetic circuit comprising a cylindrical centrally positioned pole, an annular yoke adjoining said pole, a permanent magnet positioned upon said yoke, a ferrite core spaced apart from said coil, and a plate surrounding a plurality of sides of said ferrite core, said plate being spaced-apart from said bobbin and positioned upon said magnet.

8. An air breezing pump according to claim 7, further comprised of the cylinder comprised of:
   said cylinder having upper and lower rims, and
   a plurality of dampers disposed at the upper and lower end rims of the bobbin between said bobbin and cylinder.

9. An air breezing pump according to claim 7, further comprised of the plate receiving said plurality of sides of the ferrite core.

10. An air breezing pump according to claim 7, further comprised of the bellows is right triangle-shaped and the reciprocating unit is installed on its one side.

11. An air breezing pump according to claim 7, further comprised of bellows are symmetrically disposed and the reciprocating unit is installed therebetween.

12. An air breezing pump according to claim 7, further comprised of the diameter of said piston being variably larger and smaller than that of said container.

* * * * *